(12) United States Patent
Yuan (10) Patent No.: US 10,186,269 B2
(45) Date of Patent: Jan. 22, 2019

(54) HYBRID SPEECH DATA PROCESSING IN A VEHICLE

(71) Applicant: Honda Motor Co., Ltd., Tokyo (JP)

(72) Inventor: Alvin T. Yuan, Carson, CA (US)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 15/131,615

(22) Filed: Apr. 18, 2016

(65) Prior Publication Data

US 2017/0301351 A1    Oct. 19, 2017

(51) Int. Cl.
*G10L 15/22* (2006.01)
*G10L 15/30* (2013.01)
*G10L 15/26* (2006.01)
*G10L 13/00* (2006.01)
*G06F 3/16* (2006.01)

(52) U.S. Cl.
CPC .............. *G10L 15/30* (2013.01); *G06F 3/167* (2013.01); *G10L 13/00* (2013.01); *G10L 15/22* (2013.01); *G10L 15/26* (2013.01)

(58) Field of Classification Search
CPC ........................................................ G10L 15/22
USPC ........................................................ 704/270.1
See application file for complete search history.

(56) References Cited

U.S. PATENT DOCUMENTS

| | | | | |
|---|---|---|---|---|
| 4,375,097 A * | 2/1983 | Ulug | ................... | H04B 7/18578 370/400 |
| 7,219,063 B2 * | 5/2007 | Schalk | ................... | G06Q 30/02 340/988 |
| 7,333,803 B2 | 2/2008 | Benco et al. | | |
| 7,529,675 B2 * | 5/2009 | Maes | ...................... | G10L 15/30 704/270.1 |
| 8,866,604 B2 * | 10/2014 | Rankin | .................. | G06F 3/048 340/438 |
| 9,200,915 B2 * | 12/2015 | Vulcano | ................. | G01C 21/36 |
| 9,472,188 B1 * | 10/2016 | Ouimette | ................. | G06N 5/04 |
| 2002/0141332 A1 * | 10/2002 | Barnard | .................. | H04J 3/085 370/218 |
| 2004/0019638 A1 * | 1/2004 | Makagon | ............... | G06Q 10/06 709/204 |
| 2004/0042447 A1 * | 3/2004 | Brumm | ................... | H04M 3/54 370/354 |

(Continued)

FOREIGN PATENT DOCUMENTS

CN    101621759    1/2010

*Primary Examiner* — Michael N Opsasnick
(74) *Attorney, Agent, or Firm* — Rankin, Hill & Clark LLP (57) ABSTRACT

A computer-implemented method for hybrid speech data processing in a vehicle includes receiving a first speech input at an input device in the vehicle and digitizing the first speech input into packets. The method includes storing the packets at a memory for predetermined amount of time and transmitting the packets using a wireless voice communication channel to a speech recognition server. Upon detecting a speech recognition condition is met associated with the packets or the wireless voice communication channel, the method includes converting one or more of the packets stored at the memory into text data and transmitting the text data using a wireless data communication channel to an interactive voice response system. Further, the method includes receiving a speech recognition result from the interactive voice response system and outputting the speech recognition result in the vehicle using an output device.

20 Claims, 3 Drawing Sheets

(56) References Cited

U.S. PATENT DOCUMENTS

| | | | |
|---|---|---|---|
| 2006/0041431 A1* | 2/2006 | Maes | G10L 15/30 |
| | | | 704/270.1 |
| 2006/0095568 A1* | 5/2006 | Makagon | G06Q 10/06 |
| | | | 709/224 |
| 2007/0043868 A1* | 2/2007 | Kumar | G06F 17/30707 |
| | | | 709/226 |
| 2008/0113692 A1* | 5/2008 | Zhao | H04B 15/02 |
| | | | 455/574 |
| 2008/0232559 A1 | 9/2008 | Meng et al. | |
| 2010/0250243 A1* | 9/2010 | Schalk | G10L 15/22 |
| | | | 704/201 |
| 2011/0060586 A1* | 3/2011 | Dhawan | H04M 1/2478 |
| | | | 704/231 |
| 2012/0253823 A1* | 10/2012 | Schalk | G08G 1/096877 |
| | | | 704/270.1 |
| 2013/0304457 A1 | 11/2013 | Kang et al. | |
| 2014/0225724 A1* | 8/2014 | Rankin | G06F 3/048 |
| | | | 340/438 |
| 2014/0229108 A1* | 8/2014 | Schalk | G01C 21/26 |
| | | | 701/537 |
| 2014/0365125 A1* | 12/2014 | Vulcano | G01C 21/36 |
| | | | 701/533 |

\* cited by examiner

HYBRID SPEECH DATA PROCESSING IN A VEHICLE

BACKGROUND

With advances in connected vehicle technology, it is desirable to have reliable and diverse network access while a vehicle is moving. In particular, speech recognition processing in a vehicle can use local or remote network access to provide a quality experience to a user in the vehicle. Network architectures suitable for vehicular environments present challenges in providing a quality experience because of vehicle mobility, availability of networks, quality of networks, among others. Accordingly, to provide a reliable connection for speech recognition processing in a vehicle, a network architecture should provide effective management of connections to prevent delays in processing.

BRIEF DESCRIPTION

According to one aspect, a computer-implemented method for hybrid speech data processing in a vehicle includes receiving a first speech input at an input device in the vehicle and digitizing the first speech input into packets. The method includes storing the packets at a memory for a predetermined amount of time and transmitting the packets using a wireless voice communication channel to a speech recognition server. Upon detecting a speech recognition condition is met associated with the packets or the wireless voice communication channel, the method includes converting one or more of the packets stored at the memory into text data and transmitting the text data using a wireless data communication channel to an interactive voice response system. Further, the method includes receiving a speech recognition result from the interactive voice response system and outputting the speech recognition result in the vehicle using an output device.

According to another aspect, a system for hybrid speech data processing in a vehicle includes a vehicle computing device including an input device, an output device and a communication interface, each of which are operably connected for computer communication to the vehicle. The input device receives a first speech input in the vehicle and the vehicle computing device digitizes the first speech input into packets. A network interface controller of the communication interface transmits the packets using a first communication channel established using a cellular communication to a server for speech recognition processing. Further, the network interface controller detects a speech recognition condition associated with the packets or the first communication channel and the communication interface converts a portion of the packets into text data. The network interface controller transmits the text data using a second communication channel established using the cellular communication to the server for speech recognition processing and receives a speech recognition result from the server. The output device outputs the speech recognition result in the vehicle.

According to a further aspect, a non-transitory computer readable medium with instructions for hybrid speech data processing in a vehicle executed by a processor includes receiving a first speech input at an input device in the vehicle, digitizing the first speech input into packets, and storing the packets at a memory for a predetermined amount of time. The instructions for execution by the processor include transmitting the packets using a wireless voice communication channel to a speech recognition server, detecting a speech recognition condition is met associated with the packets or the wireless voice communication channel and converting one or more of the packets into text data. Further, the instructions for execution by the processor includes transmitting the text data using a wireless data communication channel to an interactive voice response system, receiving a speech recognition result from the interactive voice response system, and outputting the speech recognition result in the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), processor Area network (CAN), Local Interconnect network (LIN), among others.

"Component", as used herein, refers to a computer-related entity (e.g., hardware, firmware, instructions in execution, combinations thereof). Computer components can include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which can include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A "vehicle sensor," as used herein can include, but is not limited to, any sensor used in any vehicle system for detecting a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

Figure 1:
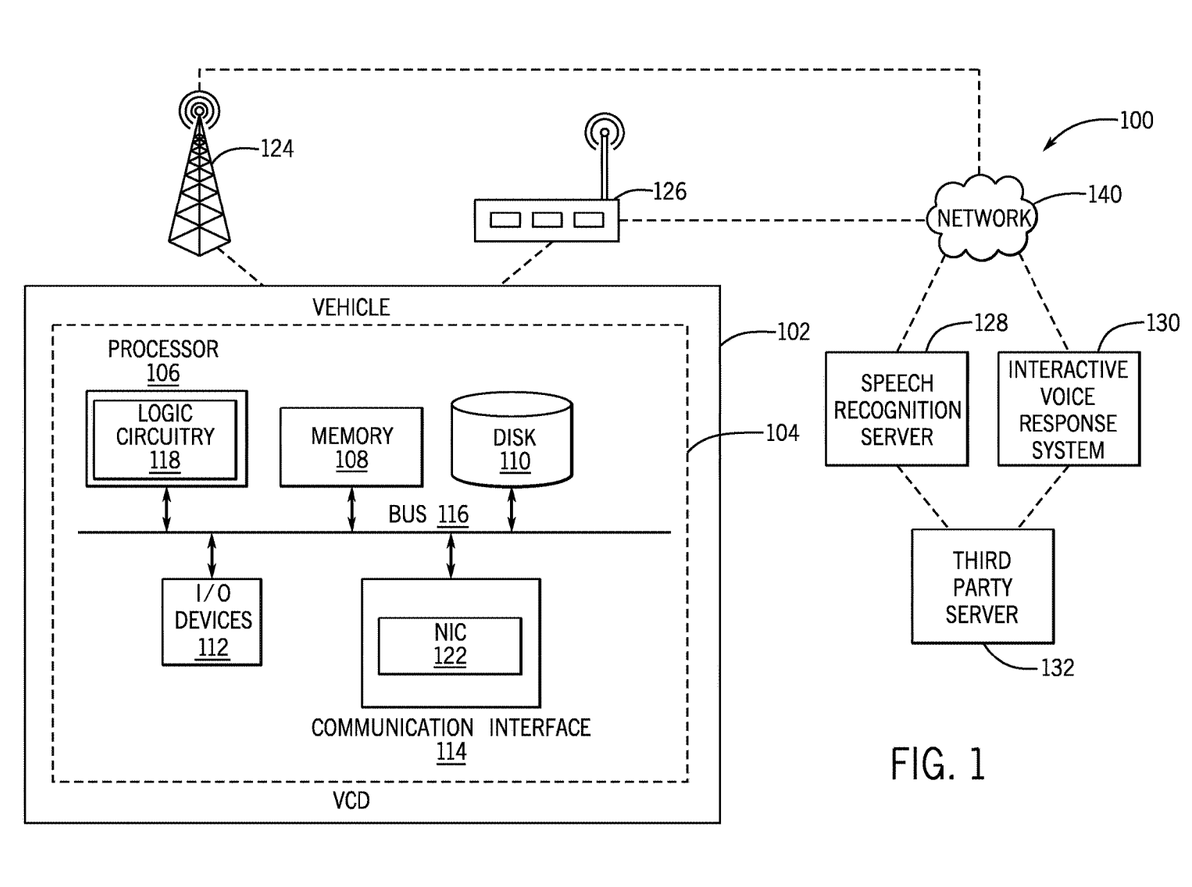
FIG. 1 is a schematic diagram of an exemplary operating environment for hybrid speech data processing in a vehicle in accordance with one embodiment.

Referring now to the drawings, wherein the showings are for purposes of illustrating one or more exemplary embodiments and not for purposes of limiting the same, FIG. 1 is a schematic view of an exemplary operating environment for implementing systems and methods for hybrid speech data processing in a vehicle in accordance with one embodiment. As can be seen in FIG. 1, an environment 100 can include various components. The components of the environment 100, as well as the components of other systems, hardware architectures, and software architectures discussed herein, can be combined, omitted, or organized into different architectures for various embodiments.

Generally, the environment 100 shown in FIG. 1 can include a vehicle 102 (e.g., a connected vehicle) and a vehicle computing device (VCD) 104. The VCD 104 can include provisions for processing, communicating and interacting with various components of the vehicle 102 and components of the environment 100. In some embodiments, the VCD 104 can be implemented along and/or in conjunction with another device, for example a vehicle computing device, a telematics control unit (TCU), a portable device, or a head-unit. Further, in some embodiments, the vehicle 102 can include other vehicle systems, sensors, and components not shown in FIG. 1.

The VCD 104 can include a processor 106, a memory 108, a disk 110, input/output (I/O) devices 112, and a communication interface 114, which are each operably connected for computer communication via a bus 116 and/or other wired and wireless technologies. The processor 106 can include logic circuitry 118 with hardware, firmware, and software architecture frameworks for facilitating hybrid speech data processing with the components of the environment 100. Thus, in some embodiments, the logic circuitry 118 can be hardware including a processor, storing application frameworks, kernels, libraries, drivers, application program interfaces, among others, to execute and control hardware and functions discussed herein.

In some embodiments, the memory 108 and/or the disk 110 can store similar components of the logic circuitry 118 for execution by the logic circuitry 118 and the processor 106. Further, as will be discussed herein, the memory 108 can store data packets, which can be digitized packets of speech input received by the I/O devices 112. The I/O devices 112 facilitate input of speech data (e.g., from a user in the vehicle 102) and output (e.g., audio, display) of speech recognition results based on the speech data.

The communication interface 114 provides software and hardware to facilitate data input and output between the components of the VCD 104 and other components of the environment 100. Specifically, the communication interface 114 can include a network interface controller (NIC) 122. The NIC 122 can be hardware (e.g., a card, a circuit board) that manages/monitors connections and controls bi-directional data transfer between the communication interface 114 and other components of the environment 100.

The NIC 122 can establish network connections in the environment 100 using various types of wireless connection protocols. For example, a connection (e.g., a communication channel) can be established using a cellular communication network 124. The cellular communication network 124 can use various protocols including CDMA, GSM, LTE, among others. Different types of communication channels can be established using the cellular communication network 124 including voice channels, data channels, and text/multimedia channels. The communication channels can be managed according to a data plan associated with a subscription to the cellular communication network 124 and the vehicle 102. For example, the data plan can define data transmission usage using different communication channels. In FIG. 1, the dashed lines between the vehicle 102, the cellular network 124 and the network 140 represent a communication channel, which can be a wireless communication channel using the cellular network 124, for example a wireless voice communication channel. In other embodiments, the communication channel can be a data communication channel using the cellular network 124.

In another embodiment, a connection (e.g., a communication channel) can be established using Wi-Fi communication facilitated, for example, by a wireless access point 126. A Wi-Fi communication protocol can include, for example, wireless protocols according to IEEE 802 protocols (e.g., IEEE 802.11, IEEE 802.3, IEEE 802.5, Bluetooth, Zigbee, WIMAXI, RFI), radio links, among others. In FIG. 1, the dashed lines between the vehicle 102, the wireless access point 126 and the network 140 represent a communication channel, which can be a wireless communication channel using the wireless access point 126 (e.g., non-cellular), for example a wireless data communication channel.

Using the cellular communication network 124 and/or the wireless access point 126, the NIC 122 can establish connections to different entities including a speech recognition server 128, an interactive voice response system 130, and a third party server 132 via a network 140. As will be discussed herein, the NIC 122 can establish different types of communication channels using the cellular communication network 124 and/or the wireless access point 126 to transmit data for speech recognition. The speech recognition server 128 can include components (not shown) to analyze speech data transmitted by the NIC 122 and process the speech data for further processing, either by the third party server 132 and/or by the VCD 104. For example, the speech recognition server 128 can determine an instruction or an output based on the analysis of the speech data and transmit the instruction and/or the output to the VCD 104 and/or the third party server 132.

The interactive voice response system 130 can receive data transmitted from the VCD 104 and provide responses either with speech and/or data to the VCD 104 and/or the third party server 132. Further, the interactive voice response system 130 can include error handling dialogues to communicate speech processing errors and/or ask for clarification from a user (e.g., in the vehicle 102). In some embodiments, the interactive voice response system 130 can be integrated with the vehicle 102. The interactive voice response system 130 can include some or all of the components of the VCD 104, for example, the I/O devices 112.

The third party server 132 can be a service entity that produces a result based on the data received from either the speech recognition server 128 or the interactive voice response system 130. For example, the third party server 132 can be a third party navigation service that can handle speech data as an input for retrieving and/or communicating navigation information. In other embodiments, the third party server could be a third party user (not shown), for example a user connected to the interactive voice response system 130 via a mobile device (not shown). In this embodiment, the speech recognition result received from the interactive voice response system 130 can be output to the third party user using the mobile device.

Figure 2:
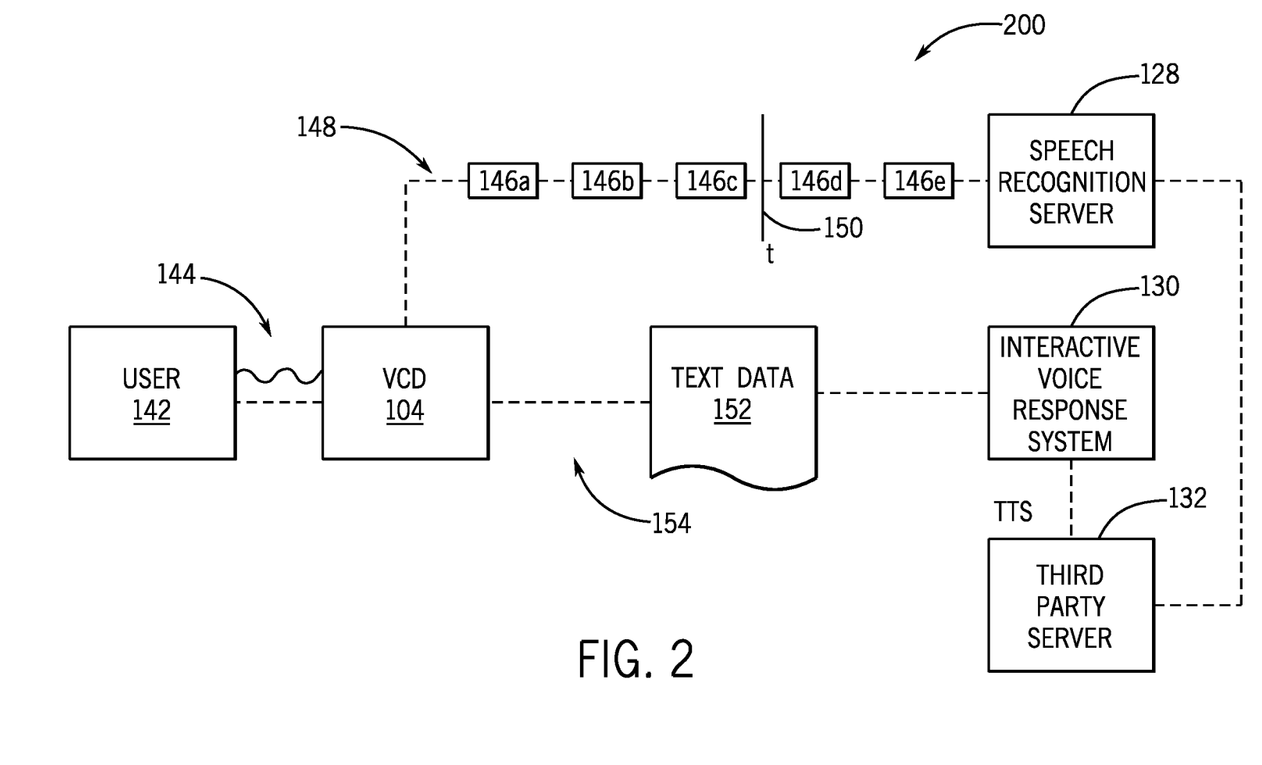
FIG. 2 is a schematic diagram of an exemplary transmission of speech input for speech recognition processing in accordance with one embodiment.
Figure 3:
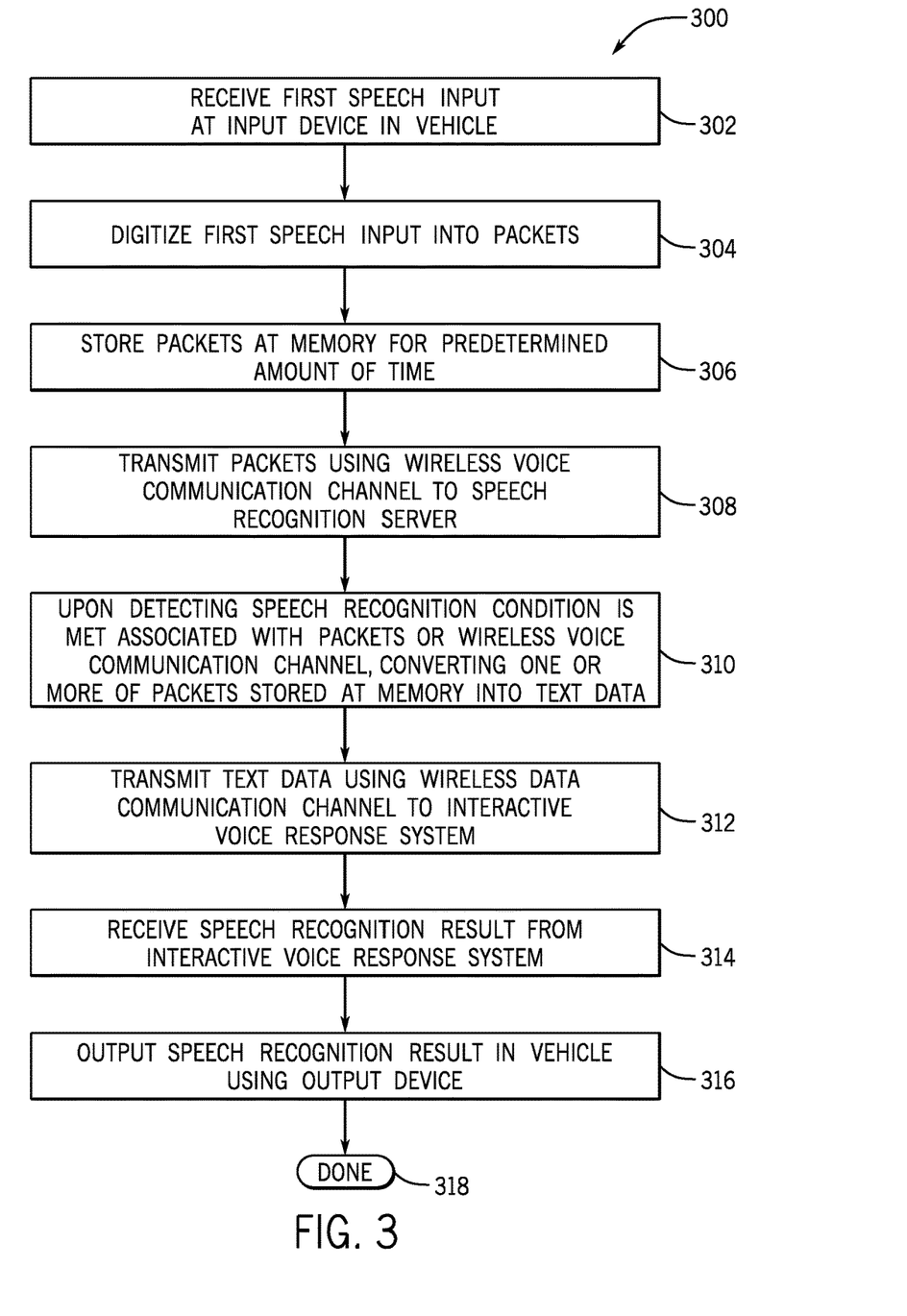
FIG. 3 illustrates an illustrative routine in accordance with one embodiment.

Referring now to FIGS. 2 and 3, an exemplary method for hybrid speech processing in a vehicle will be described according to an illustrative example. FIG. 2 is a schematic diagram of an exemplary transmission of speech input for speech recognition processing in accordance with one embodiment. FIG. 3 illustrates a method 300 that can be used to implement the exemplary transmission shown in FIG. 2. FIGS. 2 and 3 will be described with respect to the components of FIG. 1. Further, elements in FIG. 2 can include similar components and perform similar functions as similarly named/numbered elements in FIG. 1. Additionally, for simplicity, the components of the VCD 104 are not shown in FIG. 2.

The method 300 of FIG. 3 includes at block 302 receiving a first speech input at an input device in the vehicle. As discussed above with FIG. 1, the vehicle 102 can include a VCD 104 an input device (e.g., I/O devices 112), an output device (e.g., I/O devices 112), and a communication interface 114, each of which are operably connected for computer communication to the vehicle 102. Thus, in one embodiment, the I/O devices 112 (e.g., a microphone) can receive a first speech input in the vehicle 102. As shown in FIG. 2, a user 142 (e.g., a driver) located inside the vehicle 102 provides a first speech input 144. The first speech input 144 is a spoken utterance that can include one or more spoken words and/or phrases. The VCD 104 receives the first speech input 144 at an input device in the vehicle 102, for example, the I/O devices 112, which can include microphone sensors to pick up the first speech input 144.

Referring again to FIG. 3, at block 302, the method 300 can include digitizing the first speech input into packets. In one embodiment, the VCD 104 (e.g., the processor 106) digitizes the first speech input 144 into packets 146a, 146b, 146c, 146d, and 146e. In some embodiments, the packets can include less than five packets or more than five packets. Further, the method 300 at block 304 can include storing the packets at a memory for predetermined amount of time. Thus, in FIG. 1, the VCD 104 can include a memory 108 operably connected for computer communication to the vehicle 102. The processor 112 and/or the communication interface 114 can store the packets (e.g., packets 146a, 146b, 146c, 146d, and 146e) into the memory 108 for a predetermined period of time.

Further, the method 300 at block 308 can include, transmitting the packets using a wireless voice communication channel to a speech recognition server. In one embodiment, the wireless voice communication channel is a first communication channel established using a cellular communication network 124. Thus, the NIC 122 can transmit the packets 146a, 146b, 146c, 146d, and 146e to the speech recognition server 210 using a first communication channel 148. In one embodiment, shown in FIG. 2, the first communication channel 148 is a wireless voice communication channel. In another embodiment, the first communication channel 148 (e.g., the wireless voice communication channel) is established using non-cellular wireless communication, for example, using the wireless access point 126.

At block 310, the method can include detecting a speech recognition condition is met associated with the packets or the first communication channel (e.g., the wireless voice communication channel). In one embodiment, the NIC 122 can detect a speech recognition condition that is associated with the packets 146a, 146b, 146c, 146d, and 146e and/or the first communication channel 148. For example, a speech recognition condition can include a connectivity issue between the VCD 104 and the speech recognition server 128 associated with the first communication channel 148. Thus, the speech recognition condition can indicate that the first communication channel 148 is disabled, disconnected, timed out, has poor quality, slow data transmission speeds, or another type of error/connection failure. In one embodiment, the NIC 112 and/or the processor 106 can facilitate detection of the speech recognition condition. For example, a connectivity manager object (not shown) of an API included with a framework of the NIC 112 and/or the processor 106 can provide functions for managing connectivity. For example, the connectivity manager object can manage a list of configured/available connections and networks, currently active connections/networks, the current state of connections/network, Wi-Fi access point scans, among others.

As an illustrative example, in FIG. 2, the speech recognition condition is detected based on the first communication channel 148 being disconnected at point 150 at a time t. Because of the speech recognition condition 150, the packets 146a, 146b, and 146c can be lost in the transmission to the speech recognition server 128.

In some embodiments, the speech recognition condition is a threshold or a value that indicates one of the connectivity issues described above. Thus, in one embodiment, detecting the speech recognition condition can include comparing a value received and/or determined, for example, by the NIC 112 associated with the first communication channel 148 to a speech recognition condition threshold. If the speech recognition condition threshold is met, then a speech recognition condition is detected.

In another embodiment, the speech recognition condition is based on cellular plan usage, where the cellular plan associated with the vehicle. As discussed above, in some embodiments, the use of the cellular communication network 124 by the vehicle 102 is defined by a cellular plan.

Details about the cellular plan can be stored at the memory 108 and/or can be managed by the cellular communication network 124. In one embodiment, a speech recognition condition can be detected if usage of the first communication channel 148 meets a data usage limit defined by the cellular plan.

Accordingly, in one embodiment, upon detecting the speech recognition condition is met, the method 300 can include converting one or more of the packets stored at the memory into text data. In some embodiments, the method can include converting a portion of the packets into text data. Thus, in one embodiment, the processor 106 can convert one or more of the packets 146a, 146b, 146c, 146d, and 146e stored at the memory 108 into text data 152 (e.g., a text file). In the example shown in FIG. 2, the one or more packets and/or the portion of the packets to be converted into text data can be based on the speech recognition condition 150.

For example, in one embodiment, converting the one or more of the packets can include converting the one or more of the packets of the first speech input received by the input device after detecting the speech recognition condition. As shown in FIG. 2, packets 146a, 146b and 146c are received after the speech recognition condition 150. Accordingly, in this embodiment, the processor 106 can retrieve these specific packets from the memory 108 and convert the packets into the text data 152.

In another embodiment, converting the one or more of the packets can include converting the one or more of the packets of the first speech input received by the input device prior to detecting the speech recognition condition and received by the input device after detecting the speech recognition condition. Stated differently, the portion of the packets can include one or more of the packets of the first speech input received by the input device prior to detecting the speech recognition condition and received by the input device after detecting the speech recognition condition. As shown in FIG. 2, packets 146a, 146b and 146c are received after the speech recognition condition. Packets 146d and 146e are received before the speech recognition condition. Accordingly, in this embodiment, the processor 106 can retrieve all or some of the packets 146a, 146b, 146c, 146d, and 146e received after the speech recognition condition and all or some of the packets 146a, 146b, 146c, 146d, and 146e received before the speech recognition condition. In the example shown in FIG. 2, packets 146a, 146b, 146c, and 146d, are retrieved from the memory 108 and converted into the text data 152.

Referring again to FIG. 3, at block 312 the method 300 can include transmitting the text data using a wireless data communication channel to an interactive voice response system. In another embodiment, at block 312, the method can include transmitting the text data using a second communication channel established using the cellular communication to the server for speech recognition processing. Thus, the NIC 122 can transmit the text data 152 using a second communication channel 154. In FIG. 2, the second communication channel 154 can be a wireless data communication channel. The text data 152 in FIG. 2 is transmitted to the interactive voice response system 130, however, in other embodiments, the text data 152 can be transmitted to the speech recognition server 128.

In one embodiment, the interactive voice response system 130 converts the text data 152 to speech data and transmits the speech data to the third party server 132 for further speech recognition processing. In one embodiment, the third party server 132 can be a service entity that produces a speech recognition result based on the data received from either the speech recognition server 128 or the interactive voice response system 130. For example, the third party server 132 can be a third party navigation service that can handle speech data as an input for retrieving and/or communicating navigation information. In other embodiments, the third party server could be a third party user (not shown), for example a user connected to the interactive voice response system 130 via a mobile device (not shown). In this embodiment, the speech recognition result received from the interactive voice response system 130 can be output to the third party user using the mobile device. The speech recognition results either from the speech recognition server 128, the interactive voice response system 130 and/or the third party server 132 can be output in other various ways.

For example, the method 300 can include at block 314 receiving a speech recognition result from the interactive voice response system. For example, the NIC 122 can receive a speech recognition result from the interactive voice response system 130. In another embodiment, the NIC 122 can receive a speech recognition result from the speech recognition server 128. In a further embodiment, the NIC 122 can receive a speech recognition result from the third party server 132.

The speech recognition result can be based on a context from the text data and previously analyzed speech recognition results. For example, in some embodiments, the speech recognition server 128 can return and/or store previously analyzed speech recognition results, based on packets that were transmitted prior to the speech recognition detection condition. In this example, the text data 152, that can include packets based on the speech recognition detection condition can be used to generate the speech recognition result and used as context with the previously analyzed speech recognition results.

Moreover, the method 300 can include at block 316 outputting the speech recognition result in the vehicle using an output device. Thus, the I/O devices 112 can output the speech recognition result in the vehicle 102. For example, the speech recognition result can be output audibly to the user 142 in the vehicle 102 using a speaker (e.g., I/O devices 112). In another embodiment, the speech recognition result can be output visually to the user 142 in the vehicle 102 using a vehicle display (e.g., I/O devices 112). In a further embodiment, the speech recognition result can be output to the third party server 132, for example, a third party user.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A computer-implemented method for hybrid speech data processing in a vehicle, comprising:
   receiving a first speech input at an input device in the vehicle;
   digitizing the first speech input into packets;
   storing the packets at a memory for predetermined amount of time;
   transmitting the packets to a speech recognition server using a wireless voice communication channel between the vehicle and the speech recognition server;
   upon detecting a speech recognition condition is met associated with the packets or the wireless voice communication channel, converting one or more of the packets stored at the memory into text data, the speech recognition condition including the wireless voice communication channel being disabled, being disconnected, being timed out, having poor quality, having slow data transmission speeds or having a connection failure, the one or more of the packets including a portion of the packets lost in the transmitting the packets using the wireless voice communication channel because of the connectivity issue;
   transmitting the text data using a wireless data communication channel, which is different from the wireless voice communication channel, to an interactive voice response system;
   receiving a speech recognition result from the interactive voice response system; and
   outputting the speech recognition result in the vehicle using an output device.

2. The computer-implemented method of claim 1, wherein converting the one or more of the packets includes converting the one or more of the packets of the first speech input received by the input device after detecting the speech recognition condition.

3. The computer-implemented method of claim 1, wherein converting the one or more of the packets includes converting the one or more of the packets of the first speech input received by the input device prior to detecting the speech recognition condition and received by the input device after detecting the speech recognition condition.

4. The computer-implemented method of claim 1, wherein the wireless voice communication channel and the wireless data communication channel are established using cellular communication network.

5. The computer-implemented method of claim 1, wherein the wireless data communication channel is established using non-cellular wireless communication.

6. The computer-implemented method of claim 1, wherein the interactive voice response system converts the text data to speech data and transmits the speech data to a third party for speech recognition processing.

7. The computer-implemented method of claim 1, wherein the speech recognition condition is based on cellular plan usage, the cellular plan associated with the vehicle.

8. A system for hybrid speech data processing in a vehicle, comprising:
   a vehicle computing device including an input device, an output device, and a communication interface, each of which are operably connected for computer communication to the vehicle, wherein the input device receives a first speech input in the vehicle and the vehicle computing device digitizes the first speech input into packets; and
   a network interface controller of the communication interface, where the network interface controller transmits the packets to a server for speech recognition processing using a first communication channel established between the vehicle and the server for speech recognition processing and using a cellular communication network,
   wherein the server is operably connected for computer communication to the vehicle computing device, the network interface controller detects a speech recognition condition associated with the packets or the first communication channel and the communication interface converts a portion of the packets into text data,
   wherein the network interface controller transmits the text data using a second communication channel, which is different from the first communication channel and established using the cellular communication network, to the server for speech recognition processing and receives a speech recognition result from the server,
   wherein the output device outputs the speech recognition result in the vehicle,
   wherein the speech recognition condition includes the wireless voice communication channel being disabled, being disconnected, being timed out, having poor quality, having slow data transmission speeds or having a connection failure, and
   wherein the portion of the packets converted into the text data includes a portion of the packets lost in a transmission of the packets using the first communication channel because of the connectivity issue.

9. The system of claim 8, including a memory operably connected for computer communication to the vehicle, wherein the communication interface stores the packets into the memory for a predetermined period of time.

10. The system of claim 9, wherein the portion of the packets includes one or more of the packets of the first speech input received by the input device prior to detecting the speech recognition condition and received by the input device after detecting the speech recognition condition.

11. The system of claim 8, wherein the network interface controller transmits the text data using the second communication channel established using the cellular communication network to an interactive voice response system.

12. The system of claim 11, wherein the interactive voice response system converts the text data into speech data and transmits the speech data to a third party for speech recognition processing.

13. The system of claim 8, wherein the first communication channel is a voice channel and the second communication channel is a data channel.

14. The system of claim 8, wherein the speech recognition result from the server is based on a context from the text data and previously analyzed speech recognition results.

15. A non-transitory computer readable medium with instructions for hybrid speech data processing in a vehicle, the instructions for execution by a processor, comprising:
   receiving a first speech input at an input device in the vehicle;
   digitizing the first speech input into packets;
   storing the packets at a memory for a predetermined amount of time;
   transmitting the packets to a speech recognition server using a wireless voice communication channel between the vehicle and the speech recognition server;
   detecting a speech recognition condition is met associated with the packets or the wireless voice communication channel and converting one or more of the packets into text data, the speech recognition condition including the wireless voice communication channel being disabled, being disconnected, being timed out, having poor quality, having slow data transmission speeds or having a connection failure, the one or more of the packets including a portion of the packets lost in the transmitting the packets using the wireless voice communication channel because of the connectivity issue;

transmitting the text data using a wireless data communication channel, which is different from the wireless voice communication channel, to an interactive voice response system;

receiving a speech recognition result from the interactive voice response system; and outputting the speech recognition result in the vehicle.

16. The non-transitory computer readable medium of claim 15, wherein converting the one or more of the packets includes converting the one or more of the packets of the first speech input received by the input device after detecting the speech recognition condition.

17. The non-transitory computer readable medium of claim 15, wherein converting the one or more of the packets includes converting the one or more of the packets of the first speech input received by the input device prior to detecting the speech recognition condition and received by the input device after detecting the speech recognition condition.

18. The non-transitory computer readable medium of claim 15, wherein the wireless voice communication channel and the wireless data communication channel are established using a cellular communication network.

19. The non-transitory computer readable medium of claim 15, wherein the wireless data communication channel is established using non-cellular wireless communication.

20. The non-transitory computer readable medium of claim 15, wherein the speech recognition condition is based on cellular plan usage, the cellular plan associated with the vehicle.

* * * * *